United States Patent [19]
Meyer et al.

[11] Patent Number: 6,101,824
[45] Date of Patent: Aug. 15, 2000

[54] FLEXIBLE THERMOSTAT CONTROLLER THAT PERMITS VARIOUS CONTROL POINT PROFILES WHEN CONTROLLING MULTISTAGE HVAC EQUIPMENT

[75] Inventors: Jeffrey R. Meyer, Minneapolis; Daniel Thomas Uhrich, deceased, late of St. Paul, both of Minn., by Kathleen Collins Uhrich, legal representative

[73] Assignee: Honeywell Inc., Minneapolis, Minn.

[21] Appl. No.: 08/797,106

[22] Filed: Feb. 7, 1997

[51] Int. Cl.[7] .................... F25B 7/00; F25B 29/00
[52] U.S. Cl. .................. 62/175; 165/256; 236/78 D; 307/39
[58] Field of Search ................. 236/78 D, 1 EA; 62/175; 165/256; 307/39

[56] References Cited

U.S. PATENT DOCUMENTS

| | | | |
|---|---|---|---|
| 3,623,545 | 11/1971 | Pinckaers | 165/256 |
| 4,542,849 | 9/1985 | Pichot et al. | 236/1 EB |
| 4,638,850 | 1/1987 | Newell, III et al. | 165/256 |

*Primary Examiner*—William Wayner
*Attorney, Agent, or Firm*—Robert B. Leonard

[57] ABSTRACT

A thermostat for use with multistage Heating, Ventilating and Air Conditioning (HVAC) plants where a proportional/integral control loop is present for each stage of the multistage HVAC plant. Filter constants, Ki and Kp as well as stage control points and interstage values can be set independently for each stage.

2 Claims, 12 Drawing Sheets

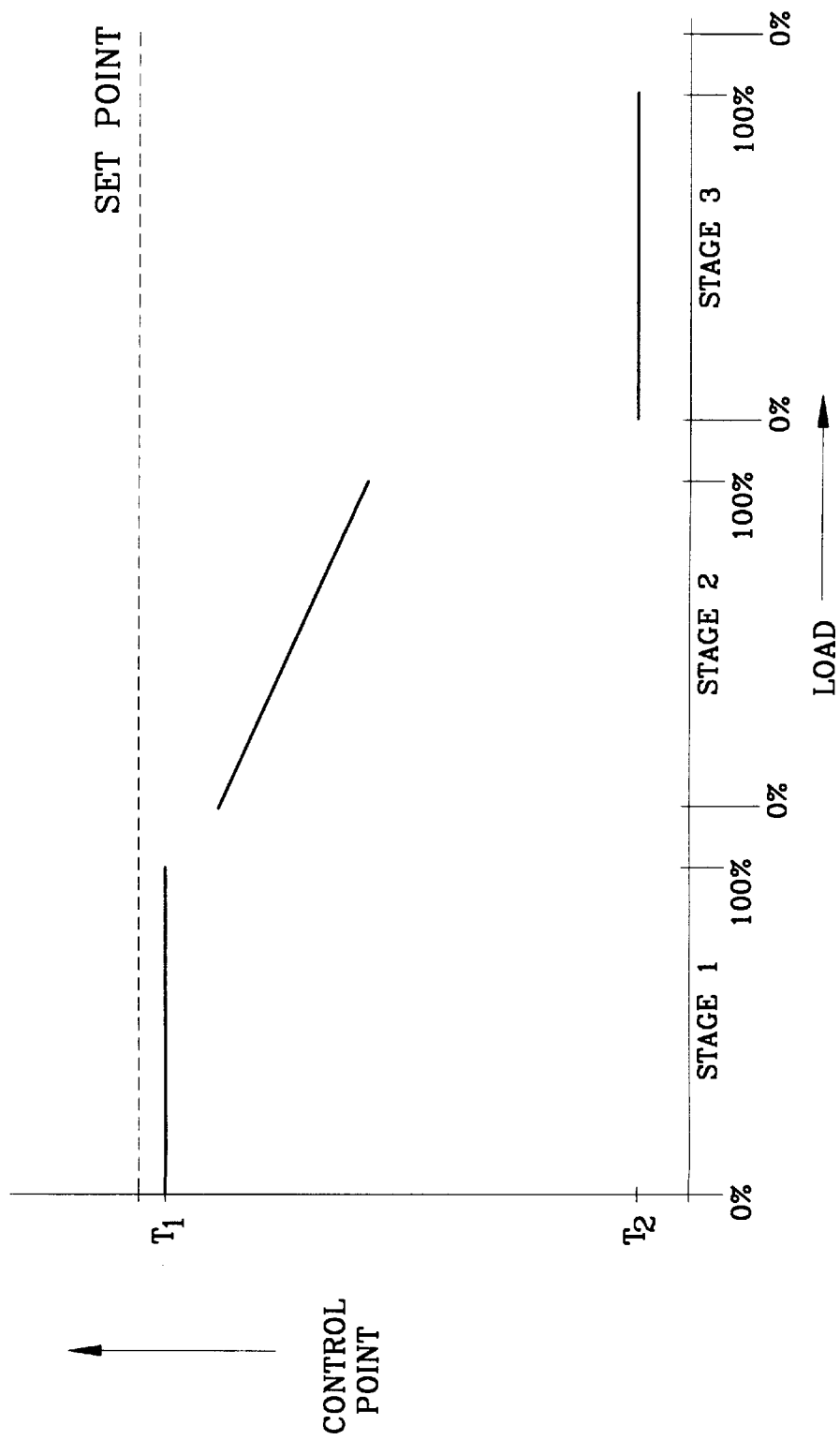

FLEXIBLE THERMOSTAT CONTROLLER THAT PERMITS VARIOUS CONTROL POINT PROFILES WHEN CONTROLLING MULTISTAGE HVAC EQUIPMENT

BACKGROUND OF THE INVENTION

This invention relates to heating ventilating and air conditioning (HVAC) systems and more particularly to controls for controlling such HVAC systems.

Electronic thermostats are generally known in the art. Typical construction of such an electronic thermostat 10 is shown in prior art FIG. 1. A processor 15, usually a microprocessor is connected to a memory 20 and sensor 25 a display 30 and an input output device 35. The processor controls overall operation of the thermostat and produces a control signal which is passed through input output (IO) device 35 to the HVAC plant for controlling the operation of the plant. The memory 20, stores instructions on which the processor operates. Sensor 25 generates an temperature signal representative of the temperature of the air in the vicinity of the sensor. Display 30 displays information to an operator of the thermostat. This information may include the current setpoint, the actual temperature sensed by the sensor 25, the operating status of the HVAC plant and the like. IO device 35 receives signals intended for the HVAC plant from the processor and converts those signals into control signals for the HVAC plant. IO device 35 also receives signals from the HVAC plant and converts those signals into signals which processor 15 can interpret.

Some U.S. Pat. Nos. which depict such a thermostat are 4,332,352 issued Jun. 1, 1982 (Jaeger), 4,387,763 issued Jun. 14, 1983 (Benton), 4,702,305 issued Oct. 27, 1987 (Beckey, et al '305), 4,702,413 issued Oct. 27, 1987 (Beckey, et al '413), 4,828,016 issued May 9, 1989 (Brown, et al) and 4,911,358 issued Mar. 27, 1990 (Mehta).

Typically, for a single stage HVAC plant, a control scheme such as that shown in prior art FIG. 2 was used. Thermostat 15A subtracted a temperature sensor signal $T_{sen}$ from a setpoint, $T_{set}$ using summer 100 to create an error signal, err. The error signal was then used in a proportional integral filter 105, 110. Filter 105 produced a proportional error signal, errp. Filter 110 produced an integral error signal erri. errp and erri were summed at adder 115 to produce a proportional integral error signal, errpi.

Anticipator 130 was used to create an anticipation signal, ant, based on the on/off status of switch 125. The anticipator is an optional feature and is normally used in the thermostat art. The anticipator is any type of signal source compatible with the adder 120 and it is energized upon operation of the HVAC plant and supplies a lag signal as negative feedback to anticipate the operation of the system.

The ant signal is subtracted from the errpi signal to create a switch error signal, errsw. Switch 125 then compares errsw with a predetermined switch setpoint, sw and turns on if a predetermined relationship, such as greater than, exists between errsw and sw. If the switch turns on, an on signal is sent to the HVAC plant to initiate HVAC plant operation.

Now referring to FIG. 3, the advent of multistage HVAC plants, 150b, 151, 152 required multiple switching capabilities. This led to inclusion of switches 126 and 127 in addition to switch 125b over the system described in FIG. 2. Each switch 125b, 126 and 127 did its own comparison of errsw to its own switch point sw1, sw2, sw3, to determine when the switch should turn on its respective stage. However, all three switches received the same errsw signal.

Mechanical thermostats, such as Honeywell's T87 The Round™ thermostat, worked in a slightly different way when used in a single stage configuration. Prior art FIG. 4 shows the control scheme for such a mechanical thermostat. Summer 405 subtracts setpoint temperature $T_{set}$ from the sensor temperature $T_{sen}$ to create a droop signal. The droop signal is then fed into summer 415 from which the anticipator signal, ant, is subtracted to produce an error switch signal, errsw. Note the lack of the proportional and integral filters in the mechanical thermostat. For multistage applications, mechanical thermostats used a control scheme which in essence provided one of the devices shown in FIG. 4 for each stage of the HVAC plant.

Referring now to FIG. 5, there shown graphically is a comparison between the control point for three stages in an electronic thermostat vs. the load of the three stages being controlled by the prior art multistage electronic thermostat of FIG. 2. Line 500 shows the setpoint. Line 501 shows the effect on the load of each stage of the multistage HVAC plant using full integration of the err signal. Line 502 shows the effect on the load of the three stages using only a partial integration of the err signal. Line 503 shows the effect of loading on the three stages in the multi plant HVAC system when no integration of the err signal is used.

Referring now to FIG. 6, there shown is a load vs. control point graph of a mechanical thermostat. Note that there may be substantial droop between the setpoint Line 600, and the load vs. control point Line 601 and 602 in the mechanical thermostat. However, the mechanical thermostat must provide the ability to maintain a certain separation between the point at which stage one is at 100 percent load and the point at which stage two initiates. This is called the "interstaging" and is represented by the difference identified at 605. This kind of interstaging has been only available to date in mechanical thermostats.

There are times when some combination of the benefits provided by a mechanical thermostat and the benefits provided by an electronic thermostat in terms of ability to control load and droop are desired. Accordingly, it is an object of the p resent invention to provide a thermostat which is configurable to provide elements as desired of both mechanical and electronic thermostatic control.

SUMMARY OF THE INVENTION

The present invention is an electronic thermostat for use with multistage heat, ventilation and air conditioning (HVAC) plants which is configurable to have a predesired control profile. The thermostat includes a first switch which turns on and off a first stage of the multi stage HVAC plant, a second switch for turning on and off the second stage of the multi stage HVAC plant, a temperature sensor which produces a temperature signal and a processor connected to the first switch and the second switch and the temperature sensor. An anticipator may also be implemented. The processor implements the first and second PID control loops. Typically, the derivative constant of the PED filter is set to zero. The first PID control loop controls the operation of the first switch while the second PID control loop controls the operation of the second switch. Each PID control loop includes a comparison of a delta (Δ)setpoint (ΔSP) signal to a delta (Δ)makepoint(ΔMP) signal to determine which signal i s larger, thereby creating a comparison (comp) signal. If an error signal currently exists, ΔMP will be set equal to zero. The comp signal is then subtracted from the setpoint for that stage to create a control point (CP) signal. The ambient temperature signal (Tsen) is then subtracted from the CP signal and filtered to produce an error signal (errpi). If an anticipator is used, the anticipator signal is added to the errpi signal to produce the switching signal. This is done for each stage.

The thermostat runs as well on an inventive process. First, the thermostat determines an initial condition of the HVAC plant. Next, if an anticipator is used, the thermostat filters the initial condition through an anticipator to create an anticipator signal. The thermostat also determines the current temperature from the temperature sensor. The thermostat reads a current $\Delta$SP and $\Delta$MP and compares the two signals. If an current errpi is being generated, the $\Delta$MP is set equal to zero. The larger of the two signals is then used as the comp signal. The comp signal is then subtracted from the setpoint for the stage to produce a CP signal. The thermostat then creates an error signal which is the difference between the Tsen and the CP signals. The error signal is then filtered through a proportional filter to create a proportional error signal and through an integral filter to create an integral error signal. The proportional error signals and the integral error signal are then added to create a proportional integral error signal. A switch error signal is then created by subtracting the anticipator signal from the proportional integral error signal. The first switch is then cycled if the switch error signal is above a first predetermined value and the second switch is cycled if the switch error signal is above a second predetermined value. These predetermined values can be chosen so only one stage cycles at a time. Lower stages are forced on, higher stages are forced off. Cycling one stage at a time is typically desirable.

BRIEF DESCRIPTION OF THE DRAWINGS

FIGS. 8–12 represent control point versus load diagrams for different selections of makepoints, $\Delta$setpoints, proportional and integral gain factors.

DETAILED DESCRIPTION OF THE PREFERRED EMBODIMENT

Figure 1:
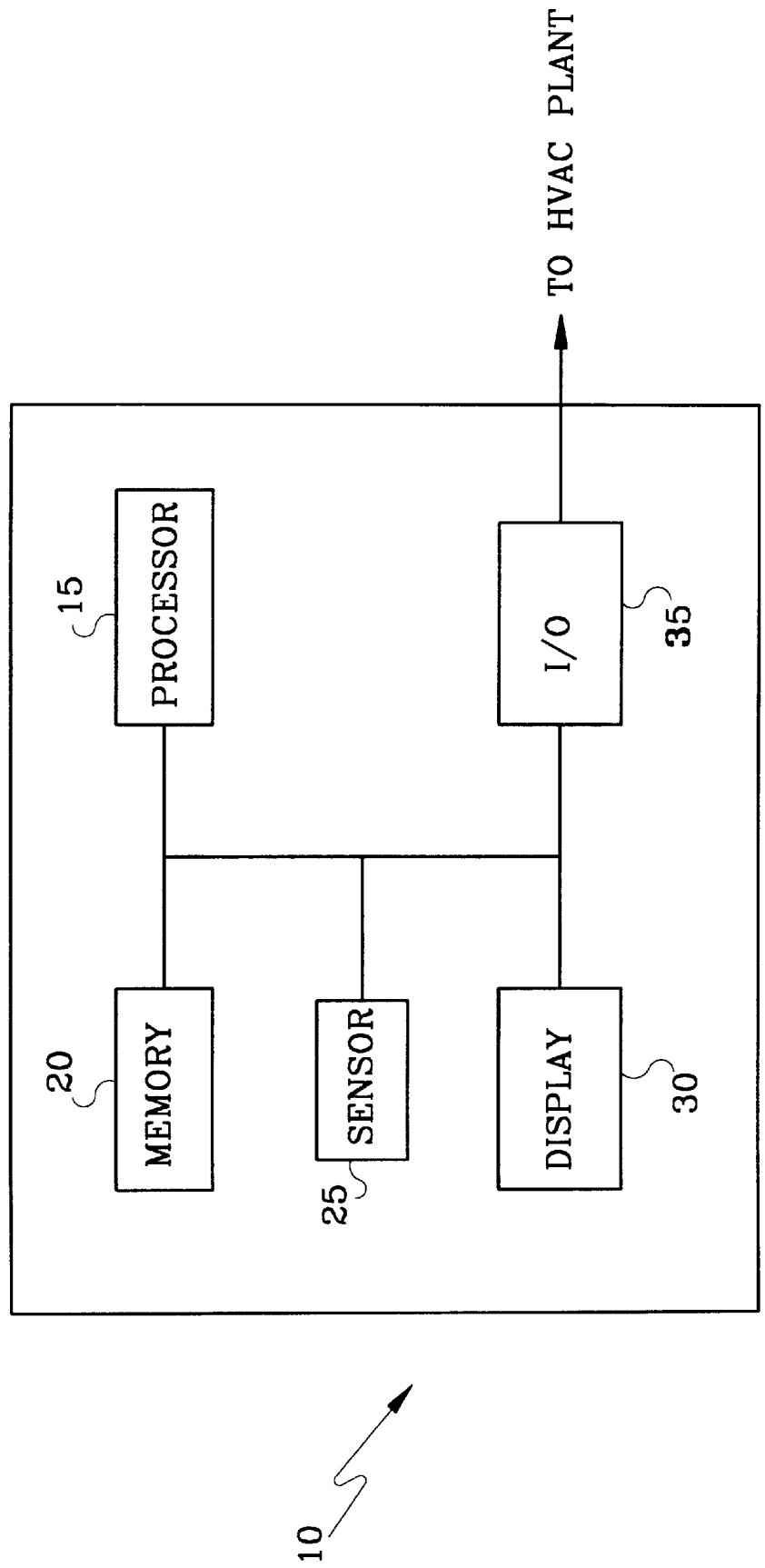
FIG. 1 is a block diagram of a prior art thermostat.
Figure 2:
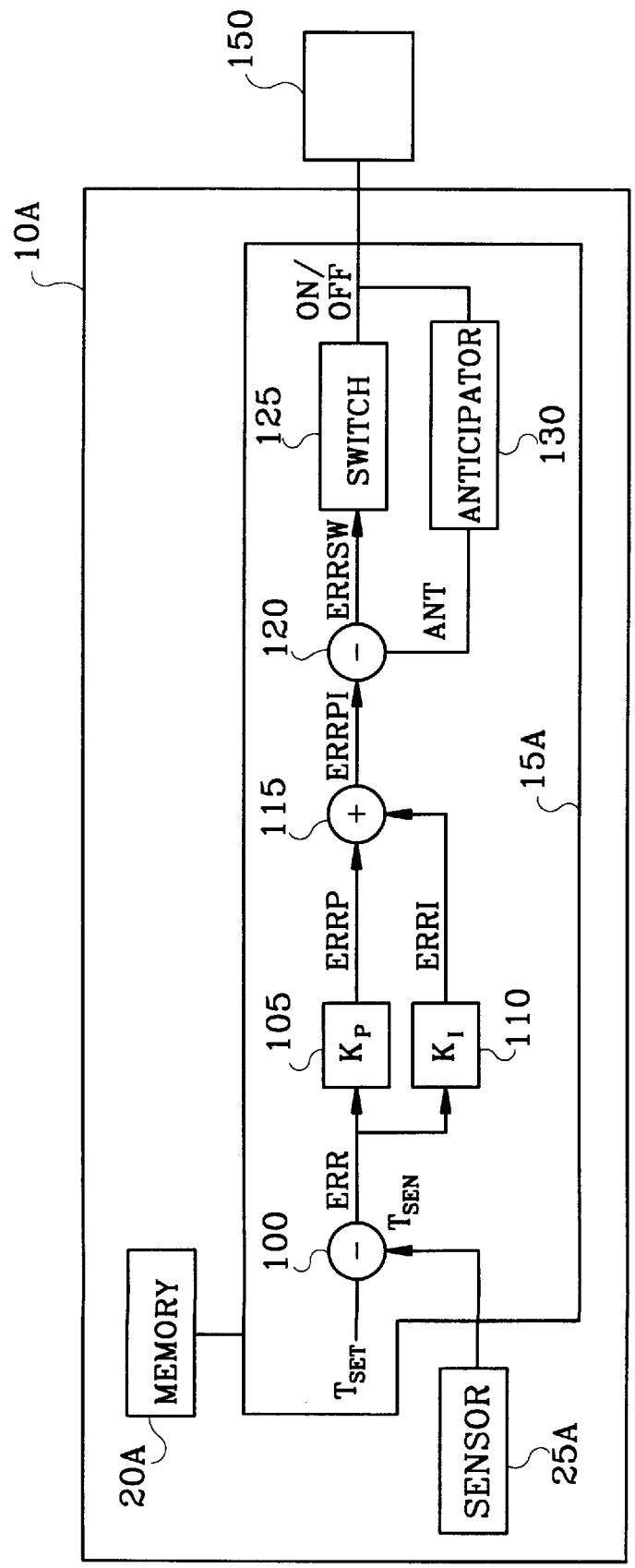
FIG. 2 is a functional diagram of a prior art electronic thermostat.
Figure 3:
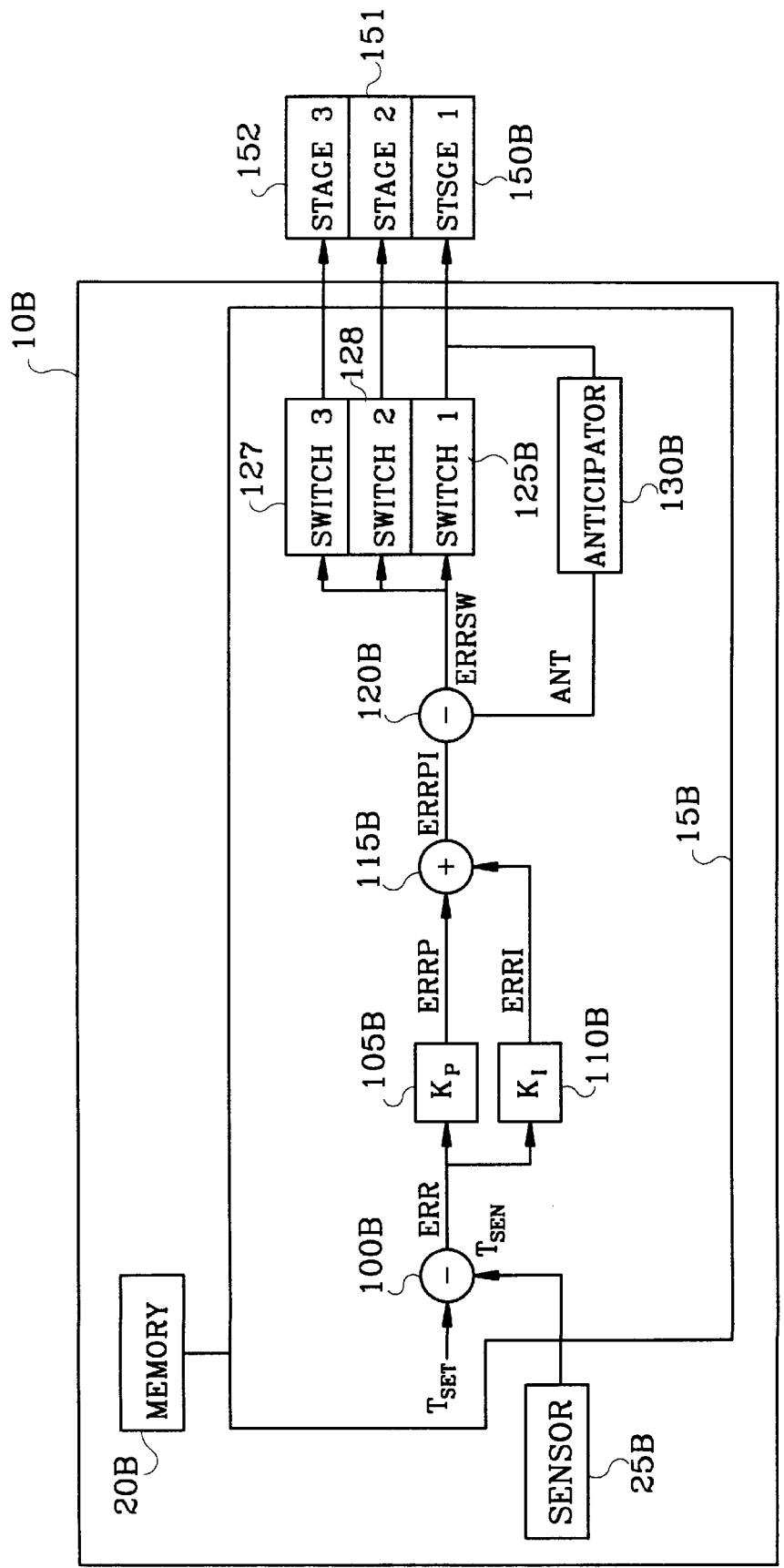
FIG. 3 is a functional diagram of a prior art thermostat for use with a multistage HVAC system.
Figure 4:
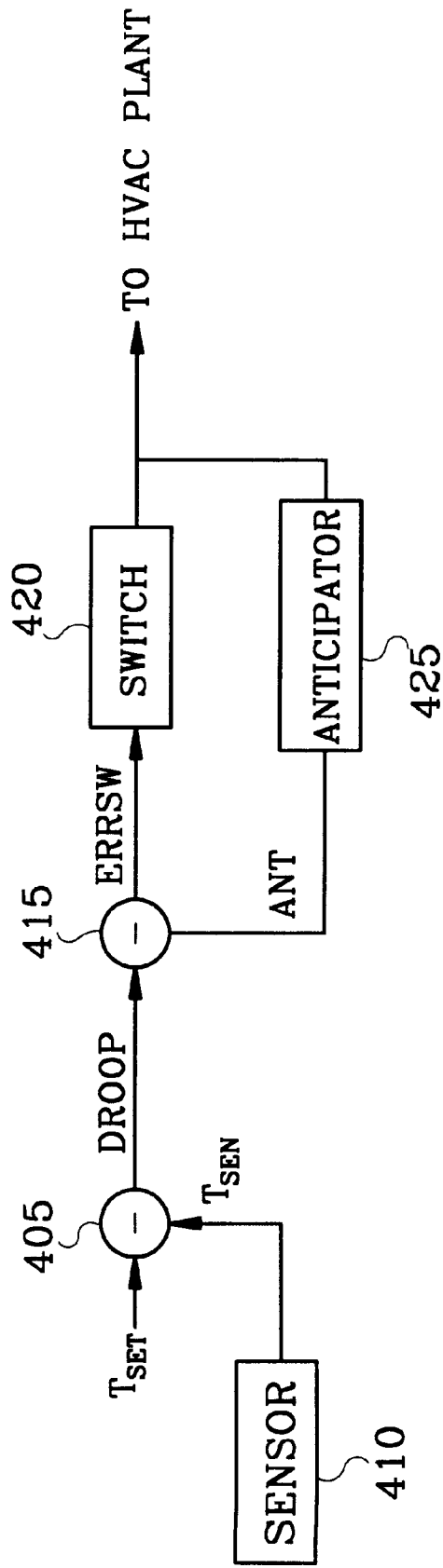
FIG. 4 is a functional diagram of a prior art mechanical thermostat for use with a single stage HVAC plant.
Figure 5:
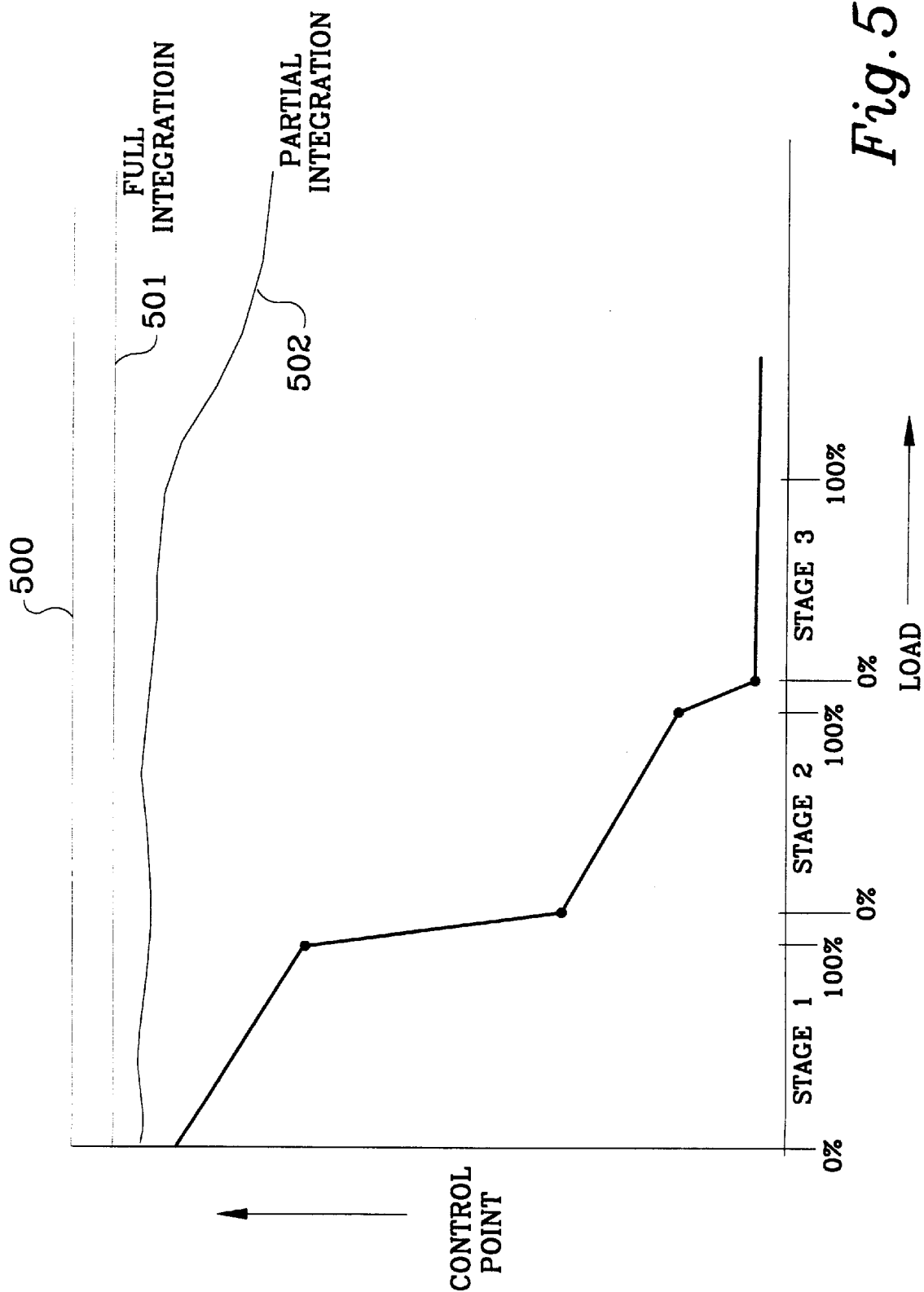
FIG. 5 is a graph of the load vs. the control point for the thermostat shown in FIG. 3.
Figure 6:
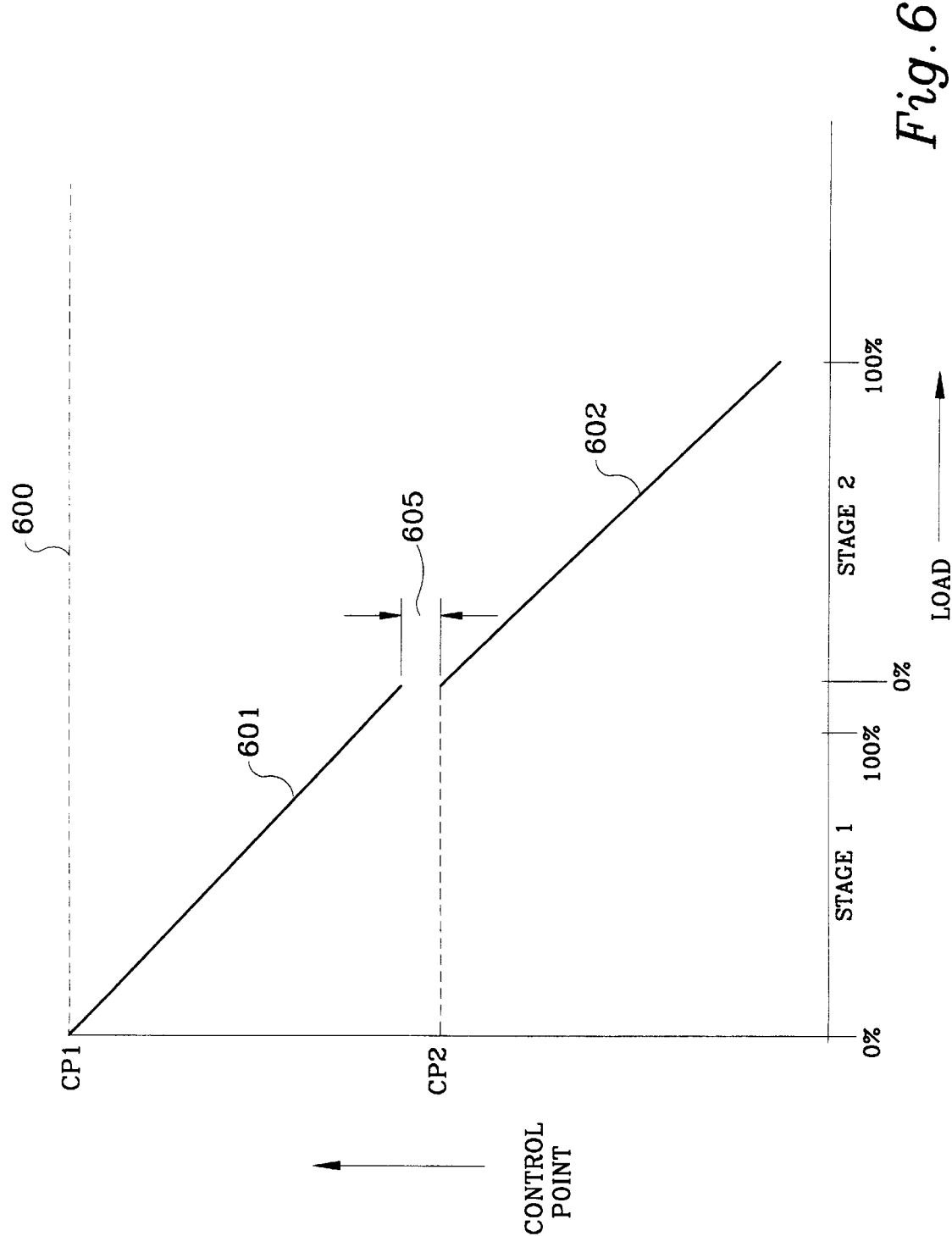
FIG. 6 is a load vs. control point graph for a multi stage mechanical thermostat.
Figure 7:
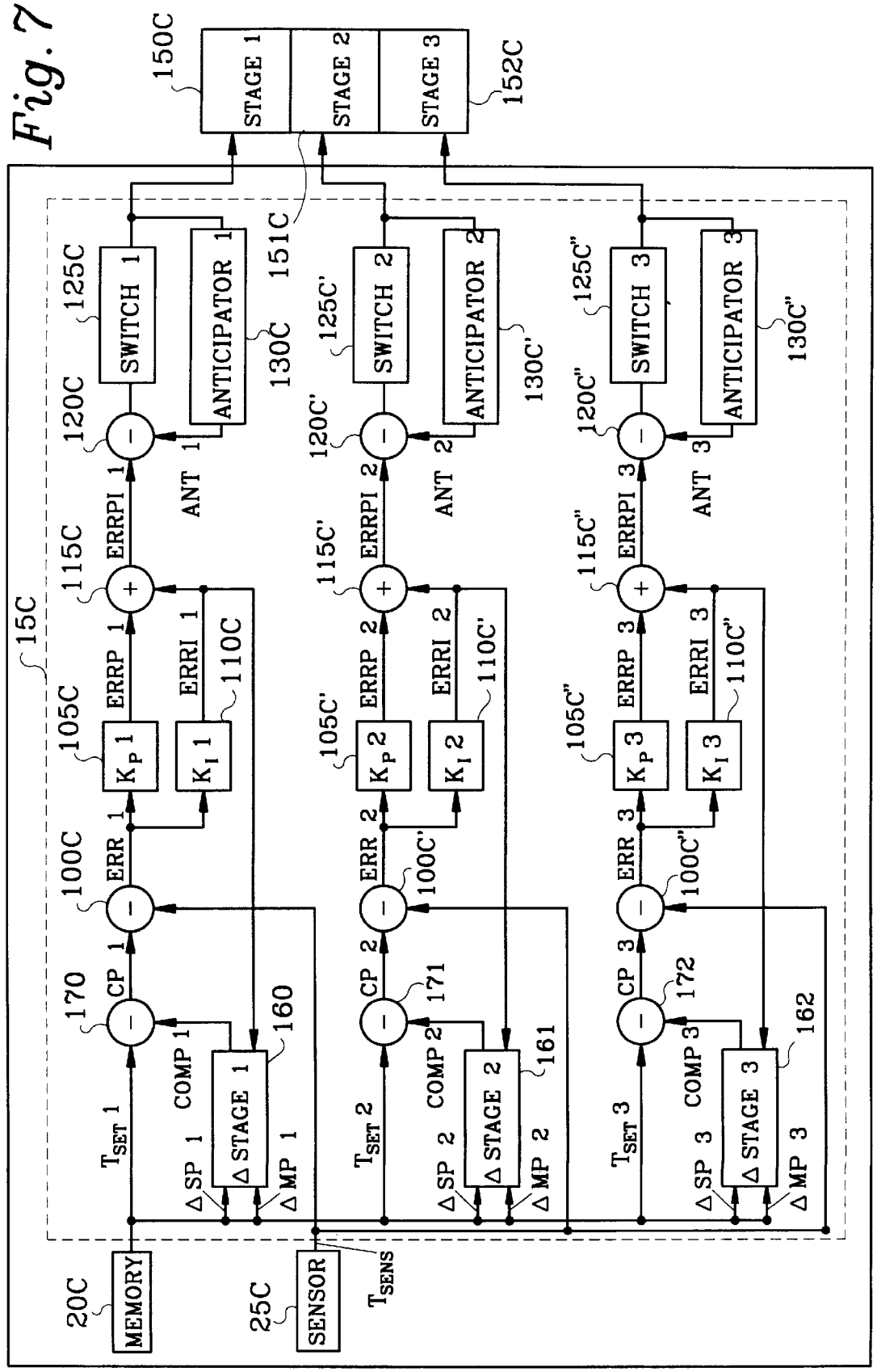
FIG. 7 is a functional diagram of the inventive thermostat.

Referring now to FIG. 7, there shown is the inventive thermostat 10C. The thermostat includes sensor 25C, processor 15C and memory 20C. Microprocessor 15C in combination with memory 20C implements individual proportional integral control schemes for each stage of the multi stage HVAC plant. As an example, this figure shows three PI control loops and three stages to the HVAC plant. However, the inventive concept is again that each stage have its own PI control loop.

In traditional multistage controls, as noted above, one switch error, errsw, was computed and used for the switching calculation for each stage. In the present invention, a separate switching error, errswi is computed for each stage i. To accomplish this, a Delta Make Point value is set for each stage.

In practice, the Delta Make Point value ($\Delta$MP1) and Delta Setpoint value ($\Delta$SP1) are fed into comparator 160 along with the erri1 signal. If the erri1 >0, then $\Delta$MP1 is set equal to zero and the comparator the greater of the $\Delta$SP1 and $\Delta$MP1 the output of the comparator, comp 1. Comp 1 is then subtracted at adder 170 from $T_{set1}$ to generate CP1. For stage one of the HVAC plant, anticipator 130C determines the on/off status of the stage and develops an ANT signal which is fed to summer 120C. Temperature sensor 25C produces a temperature signal $T_{sen}$ which is subtracted from CP1 at adder 100C to produce err1 signal. The err1 signal is filtered through a proportional signal at 105C and at integral signal at 110C to produce an err1 signal and an erri1 signal which are summed at 115C to produce an errpi1 signal. The ant1 signal is subtracted from the errpi1 signal at 120C to generate an errsw1 signal which is fed to switch 125C. If the errsw1 signal bears a predetermined relationship to the sw1 switch setpoint the switch is cycled and the appropriate signal sent to stage one of the HVAC plant.

Similar operations occur for the PI control loops for stages 2 and 3. However, each PI loop has its own temperature setpoint, $T_{set2}$ and $T_{set3}$ respectively, and their own switch levels for cycling of switches 125C' and 125C", sw2 and sw3 respectively.

As an example, assume $T_{set}$ and Ambient are currently 70° F., $\Delta$MP=0° F., $\Delta MP_2$=1° F., $\Delta MP_3$=2° F., all $\Delta$SPs=0° F. If we know that a stage cannot gain control to cycle unless its error, err, is positive, then stage 1 can cycle while stage 2 and stage 3 remain off because its control points (c.p.2, c.p.3) are 68° F. and 69° F. respectively.

But what if the load increases thereby stage 2 and/or stage 3 are needed to cycle to maintain the temperature? In this case the Ambient would begin to drop, increasing the integral error. If we know that erri can build for only one stage at a time and that once a stage's integral, erri, is maximized the next stage integral can build, then given Ambient <70° F., we know that eventually stage 2 will begin to integrate making $erri_2$>0. This will force $c.p._2$ to jump to 70° F. because $AMP_2$ is taken as 0. Stage 2 is given control at this point, stage 1 is locked on. If stage 2 cycling can maintain $T_{set}$ eventually err will again become 0. Stage. 3 will not be energized unless stage cannot maintain $T_{set}$ for a significant time, or the Ambient drops below 68° F.

As the system load lightens and stage 2 is no longer needed, Ambient will float up >70° C., $err_2$ will go to 0, $erri_1$ will deintegrate again, $c.p._2$ will go back to 69° F., and stage 1 maintain $T_{set}$ on its own.

Now that we have a basic understanding of $\Delta$SP, $\Delta$MP, Ki and Kp, we can build the load profiles shown in FIGS. 8–12 using the values identified below.

| FIG. | Stage | Ki | Kp | $\Delta$SP | $\Delta$MP |
| --- | --- | --- | --- | --- | --- |
| 8 | Stage 1 | >0 | >0 | 0 | 0 |
|   | Stage 2 | >0 | >0 | $T_1 - T_2$ | 0 |
|   | Stage 3 | >0 | >0 | $T_1 - T_3$ | 0 |
| 9 | Stage 1 | >0 | >0 | 0 | 0 |
|   | Stage 2 | 0 | >0 | 0 | 1 |
|   | Stage 3 | >0 | >0 | $T_1 - T_2$ | 0 |
| 10 | Stage 1 | >0 | >0 | $T_2 - T_1$ | 0 |
|   | Stage 2 | 0 | >0 | $T_2 - T_1$ | 1 |
|   | Stage 3 | >0 | >0 | $T_2 - T_3$ | 0 |
| 11 | Stage 1 | >0 | >0 | 0 | 0 |
|   | Stage 2 | >0 | >0 | 0 | 1 |
|   | Stage 3 | 0 | >0 | 0 | 2 |
| 12 | Stage 1 | >0 | >0 | 0 | 0 |
|   | Stage 2 | 0 | >0 | 0 | 1 |
|   | Stage 3 | >0 | >0 | $T_1 - T_2$ | 0 |

Figure 8:
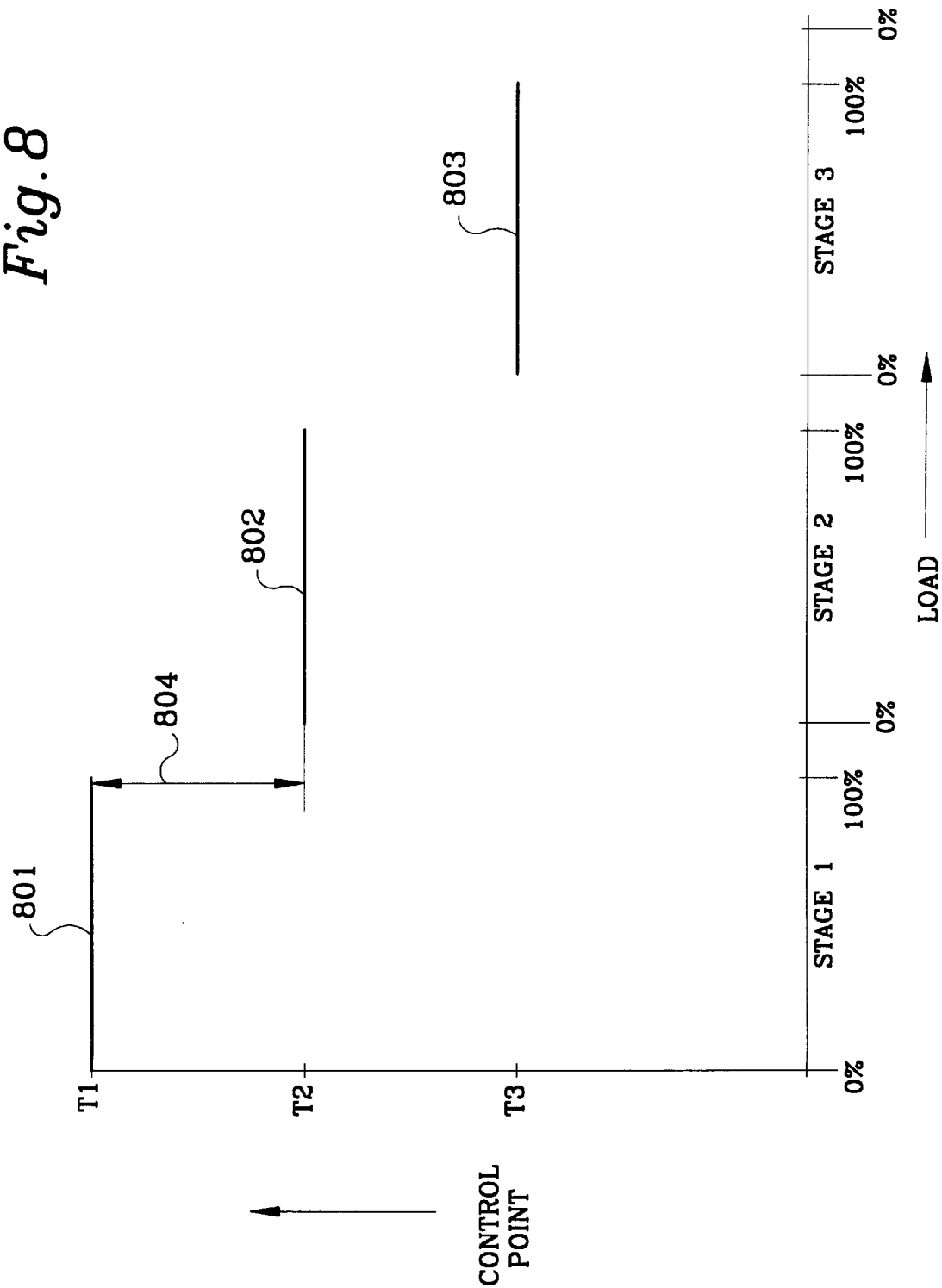

One of ordinary skill in the art will understand after reading this description that many variations are possible on the curves shown in FIGS. 8–12. Selection of the actual values shown in the chart above are a matter of design choice depending upon the type of curved by the designer. As examples, actual values which can be used to produce the results shown in FIG. 8 are:

| Stage | Ki | Kp | ΔSP | ΔMP |
|-------|------|-----|-------|-----|
| 1 | 1/32 | 1 | 0° F. | 0 |
| 2 | 1/32 | 1 | 2° F. | 0 |
| 3 | 1/32 | 1 | 4° F. | 0 |

Note that the actual value of Ki is not critical for this example as long as it is >0. A positive Ki gives us integral action which gives us the horizontal control lines shown in FIG. 8.

Figure 9:
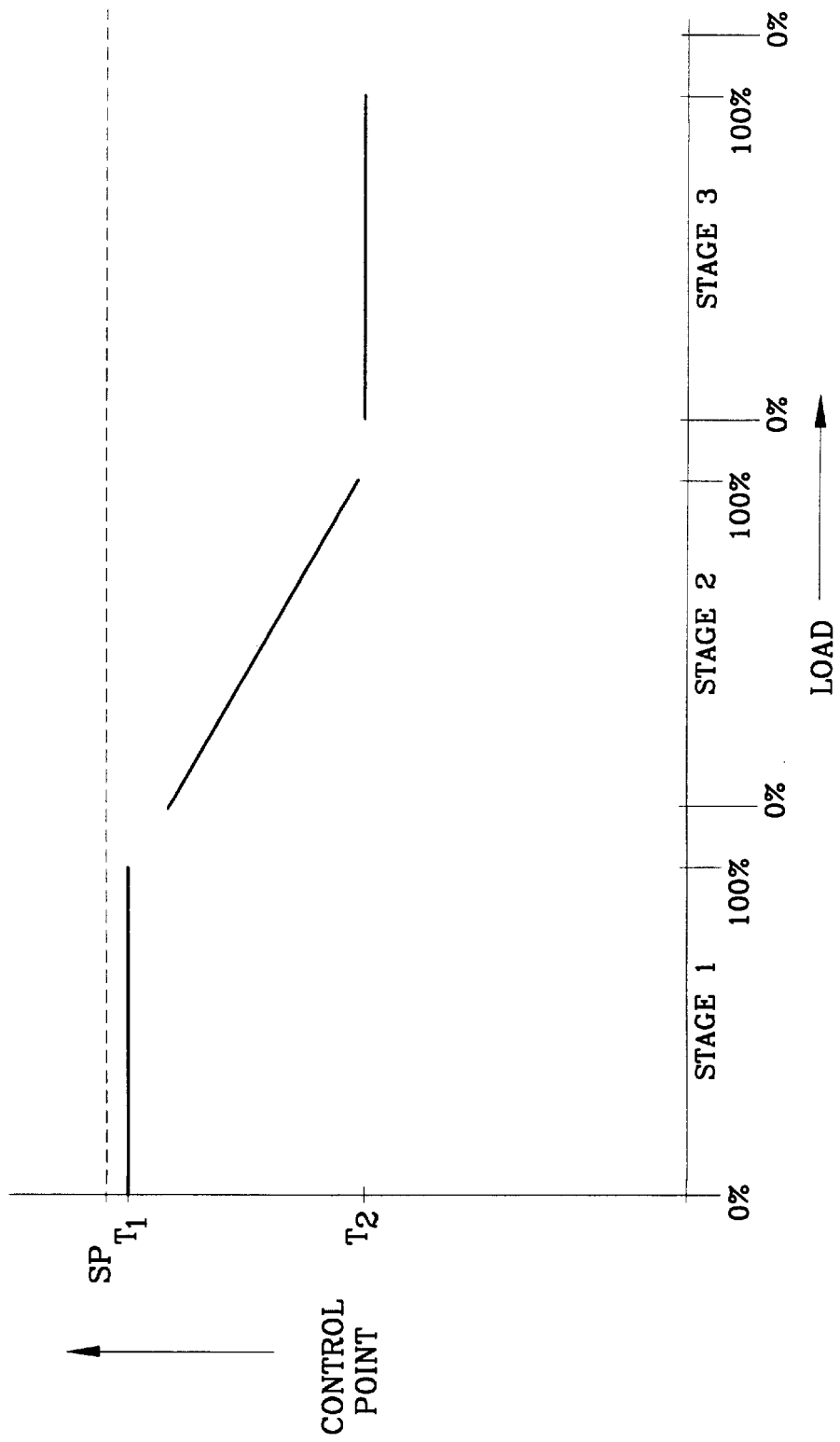
Figure 10:
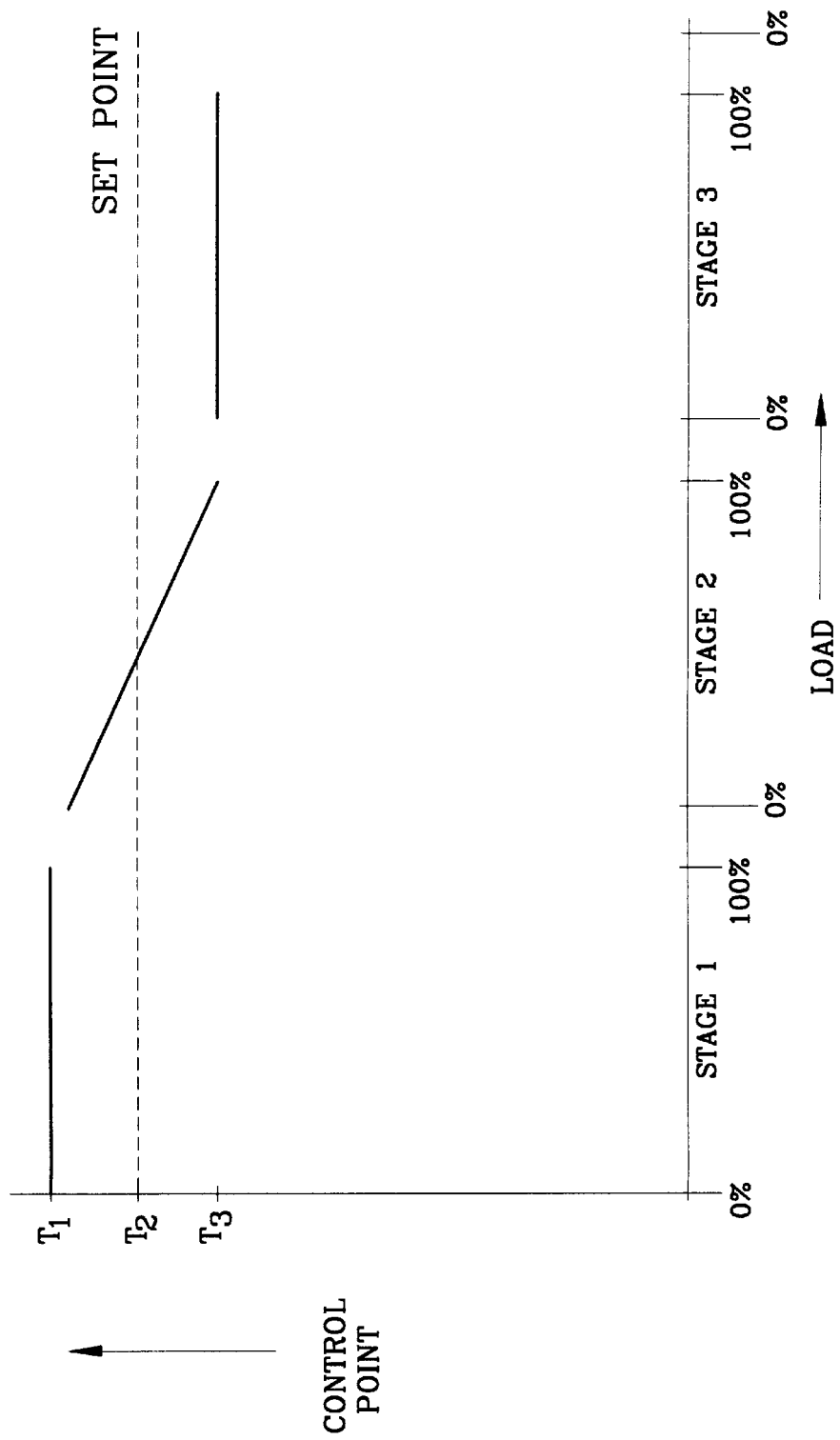
Figure 11:
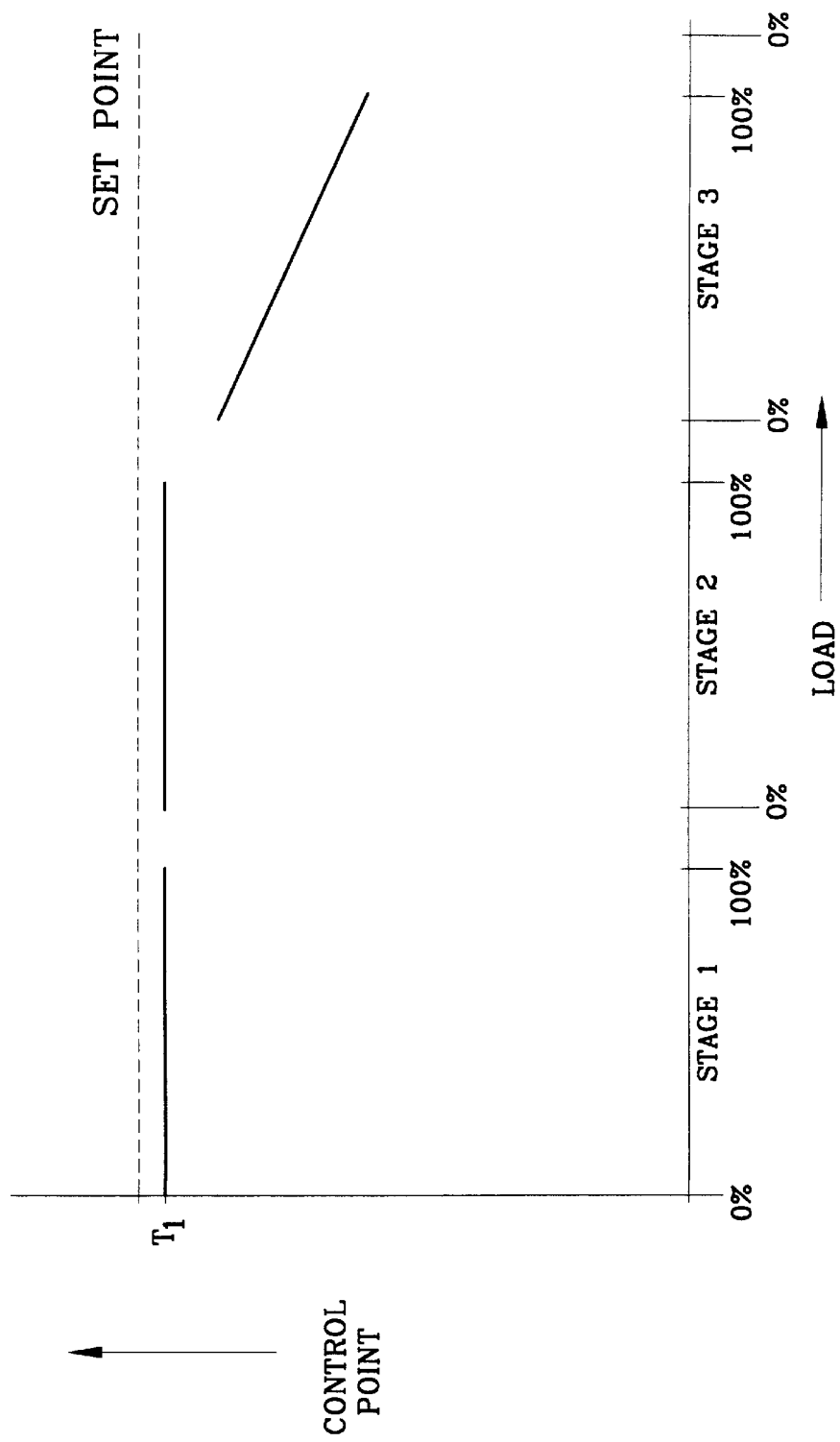

Actual values which can be used to produce the results shown in FIG. 9:

| Stage | Ki | Kp | ΔSP | ΔMP |
|-------|------|-----|-------|-----|
| 1 | 1/32 | 1.5 | 0° F. | 0 |
| 2 | 0 | 1 | 1° F. | 0 |
| 3 | 1/64 | 1 | 5° F. | 0 |

We claim:

1. A process of controlling an HVAC plant having a plurality of stages and a temperature sensor located in a space whose temperature is controlled by the HVAC plant, comprising the steps of:

determining an initial condition of the HVAC plant;

filtering said initial condition of the HVAC plant through an anticipator to create an anticipator signal, determining a current temperature signal from the temperature sensor;

creating an error signal which is equal to the difference between the current temperature signal and a temperature setpoint signal;

filtering the error signal through a proportional filter to create a proportional error signal;

filtering the error signal through an integral filter to create an integral error signal;

adding the proportional error signal and the integral error signal to create a proportional integral error signal;

subtracting said anticipator signal from said proportional integral error signal to create a switch error signal;

changing the state of the first stage if said error signal is above a predetermined value; and repeating this process for each stage of said plurality of stages, wherein each stage has its own setpoint temperature.

2. A temperature control device for a multiple stage HVAC plant, comprising:

a first switch for turning on and off a first stage of the HVAC plant;

a second switch for turning on and off a second stage of the HVAC plant;

a temperature sensor for producing a temperature signal representative of the temperature and the space in which the temperature is to be controlled;

a processor connected to the first switch, the second switch, and the temperature sensor, the processor including a first anticipator, a second anticipator, first, second, third, fourth, fifth and sixth summers, first and second proportional filters and first and second integral filters, said first anticipator determining from said first switch a state of said first stage and producing a anticipator signal, said first summer receiving a temperature signal from the temperature sensor and creating a first error signal, which is the difference between a thermostat setpoint and the temperature signal, said error signal then being filtered by said first proportional filter and said first integral filter, filtered signals being summed by said second summer, said third summer subtracting said anticipator signal from said summed filter signal to produce a first switch signal, comparing said first switch signal to a first predetermined switch level, said first switch cycling if said first switch signal bears a first predetermined relationship to said predetermined switch level signal, said second anticipator determining from the second switch a state of said second stage and producing a second anticipator signal, said fourth summer receiving a temperature signal from the temperature sensor and creating a second error signal, which is the difference between a stage control point and the temperature signal, said error signal then being filtered by said second proportional filter and said second integral filter, filtered signals being summed by said fifth summer, said sixth summer subtracting said anticipator signal from said summed filter signal to produce a second switch signal, comparing said second switch signal to a second predetermined switch level, said second switch cycling if said second switch signal bears a second predetermined relationship to said second predetermined switch level signal.

* * * * *